United States Patent
Baumgartner et al.

(10) Patent No.: US 12,175,197 B2
(45) Date of Patent: Dec. 24, 2024

(54) AUTOMATIC IDENTIFICATION OF FACT CHECK FACTORS

(71) Applicant: Google LLC, Mountain View, CA (US)

(72) Inventors: Simon Baumgartner, Mountain View, CA (US); Shan Jiang, Mountain View, CA (US); Abraham P. Ittycheriah, Mountain View, CA (US); Cong Yu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 254 days.

(21) Appl. No.: 17/778,628

(22) PCT Filed: Nov. 21, 2019

(86) PCT No.: PCT/US2019/062584
§ 371 (c)(1),
(2) Date: May 20, 2022

(87) PCT Pub. No.: WO2021/101549
PCT Pub. Date: May 27, 2021

(65) Prior Publication Data
US 2022/0335221 A1    Oct. 20, 2022

(51) Int. Cl.
*G06F 40/30* (2020.01)
*G06F 40/279* (2020.01)

(52) U.S. Cl.
CPC ............ *G06F 40/30* (2020.01); *G06F 40/279* (2020.01)

(58) Field of Classification Search
CPC ....... G06F 40/30; G06F 40/279; G06N 20/00; G06Q 10/00
See application file for complete search history.

(56) References Cited

U.S. PATENT DOCUMENTS

2013/0198196 A1*  8/2013  Myslinski .............. G06Q 30/02
                                                              707/758
2016/0283463 A1*  9/2016  M R ..................... G06F 16/243
(Continued)

FOREIGN PATENT DOCUMENTS

WO    WO2019/043381    3/2019

OTHER PUBLICATIONS

Anonymous, "Client Server Model—Wikipedia", Mar. 15, 2019, https://wikipedia.org/w/index.php?title=Client-server_model&oldid=887945231, 6 pages.
(Continued)

*Primary Examiner* — Huyen X Vo
(74) *Attorney, Agent, or Firm* — DORITY & MANNING P.A.

(57) ABSTRACT

Methods, systems, and apparatus, including computer programs encoded on a computer storage medium, that facilitate automatic identification of a set of fact-check factors from digital documents. Digital documents can be identified from a plurality of sources. For each digital document, a set of fact check factors are identified using a trained sequence tagging model. Based on the sequence tagging model, a confidence value representing a likelihood that the set of fact check factors identified from the digital document are an actual set of fact check factors for the digital document is determined. The set of fact check factors is stored in association with the digital document. A request for fact check factors for a particular digital document among the digital documents is received from a fact checking entity. In response, the set of fact check factors identified from the particular digital document are provided to the fact checking entity.

18 Claims, 3 Drawing Sheets

(56) References Cited

U.S. PATENT DOCUMENTS

| | | | | |
|---|---|---|---|---|
| 2018/0286429 A1* | 10/2018 | Bostick | ............... | A61B 5/4803 |
| 2020/0202073 A1* | 6/2020 | Ghulati | ............... | G06F 40/295 |
| 2023/0334254 A1 | 10/2023 | Ghulati | | |

OTHER PUBLICATIONS

International Search Report for Application No. PCT/US2019/062584, mailed on Aug. 10, 2020, 2 pages.
International Preliminary Report on Patentability for Application No. PCT/US2019/062584, mailed Jun. 2, 2022, 10 pages.
Machine Translated Chinese Search Report Corresponding to Application No. 2019801034542 on Jul. 10, 2024.

\* cited by examiner

AUTOMATIC IDENTIFICATION OF FACT CHECK FACTORS

PRIORITY CLAIM

This application is based upon and claims the right of priority under 35 U.S.C. § 371 to International Application No. PCT/US2019/062584 filed on Nov. 21, 2019. Applicant claims priority to and the benefit of this application which is incorporated herein by reference in its entirety.

BACKGROUND

This specification relates to automatic identification of a set of fact-check factors from digital documents.

Misinformation is pervasive on the World Wide Web in the form of, e.g., fabricated stories and articles with skewed facts (which are often referred to as "fake news"). To combat such misinformation, journalists write articles that determine the accuracy and correctness of factual claims by conducting research and linking evidence. These articles are commonly referred to as fact-checks, and the individuals or organizations who publish such articles are referred to as fact-checkers (also referred to in this specification as fact checking entities).

A typical fact-check article (which is also referred to in this specification as a fact check article) can include at least the following information (which is also referred to in this specification as fact check factors): the claim to be checked, the claimant who made the claim, and a verdict describing the veracity of the claim, as determined by the fact-checker. For example, a fact check article can (1) identify the claim that "Barrack Obama was born in Kenya," (2) the claimant, XYZ News Organization, that made the claim, and (3) specify the veracity of the claim, which in this case is False. A fact check article document could also provide additional information, such as, e.g., the context in which the claim is made, evidence supporting or rebutting the claim, etc.

SUMMARY

In general, one innovative aspect of the subject matter described in this specification can be embodied in methods that can include the operations of identifying digital documents from a plurality of publishers; for each of the digital documents: identifying, from the digital document and using a trained sequence tagging model, a set of fact check factors specifying a claim to be fact checked, a claimant that made the claim, and a veracity of the claim; and determining, based on the trained sequence tagging model, a confidence value representing a likelihood that the set of fact check factors identified from the digital document are an actual set of fact check factors for the digital document; storing, in a storage device, the set of fact check factors in association with the digital document; receiving, from a fact checking entity, a request for fact check factors for a particular digital document among the digital documents; in response to receiving the request for fact check factors for the particular digital document, providing, to the fact checking entity, the set of fact check factors identified from the particular digital document. Other embodiments of this aspect include corresponding systems, devices, apparatus, and computer programs configured to perform the actions of the methods. The computer programs (e.g., instructions) can be encoded on computer storage devices.

These and other embodiments can each optionally include one or more of the following features.

In some implementations, methods can also include the operations of: for each digital document, determining whether the confidence value satisfies a confidence threshold; and wherein storing the set of fact check factors in association with the digital document comprises storing the set of fact check factors in association with the digital document only when the confidence value satisfies the confidence threshold.

In some implementations, methods can also include the operations of: or each digital document: identifying, using a search engine and based on the set of fact check factors, a set of resources other than the digital document that reference the set of fact check factors; and adjusting the confidence value based on whether a number of the identified resources satisfies a particular threshold.

In some implementations, methods can also include the operations of: training the sequence tagging model, the training comprising: identifying a set of known fact check articles and a corresponding set of known fact check factors; and for each known fact check article: generating equal length sequences of words using words present in the known fact check article; and for each sequence of words, generating a sequence of labels for each sequence of words by matching the words of the known fact check factors for the known fact check article with words in the sequence of words, wherein each label either represents one of the fact check factors or represents a word that does not belong to any fact check factor; and training the sequence tagging model to generate a sequence of labels for an input sequence of words using sequences of words in the known fact check article and the corresponding sequence of generated labels.

Particular embodiments of the subject matter described in this specification can be implemented to realize one or more of the following advantages. For example, the innovations described in this specification automatically identify fact check factors from fact check articles, irrespective of the entity that drafted the fact check article and even when this article does not include the particular markup language with tags that specifically identify the fact check factors. Some conventional techniques identify fact check factors based on markup language (e.g., ClaimReview, which is a schema.org open standard tagging system or "markup" that search engines and other major digital platforms use to find and highlight fact-checking articles) present within the fact check article that have tags for identifying the fact check factors. However, most fact check articles, which are often prepared by different entities/publishers, generally do not include such markup and thus, such conventional techniques are unable to identify fact check factors from such fact check articles. Other conventional techniques can utilize a set of rules to identify fact check factors based on certain linguistic patterns in fact check articles. For example, a claim may generally be followed by certain verbs such as "(someone) claimed . . . " or "(someone) said . . . ." However, such pattern-based rules fail to account for the various possible differences in writing styles and formatting across different publishers, and thus, fail to consistently and accurately identify fact check factors from fact check articles. Unlike these conventional techniques, the techniques described in this specification (as described throughout this specification) can more accurately identify fact check factors from fact check articles without needing any specific markup in the article or even when fact check factors are included in these articles in varying formats and styles (i.e., without following any specific pattern). In this way, aspects of the present disclosure address technical problems associated with data identification, particularly where aspects of the format of the data to be identified are unknown.

The innovations described in this specification can also improve network security by first determining whether a particular digital document is in fact a fact check article before further processing this digital file within a potentially sensitive environment of the fact checking entity (or any other entity). In some implementations, the innovations described in this specification can be implemented, e.g., as a service that is separate from the fact checking entity (or another entity). In such implementations, the described techniques for the identification of fact check factors can determine whether a particular digital document is a fact check article (e.g., by determining whether any fact check factors can be identified from the content of the digital document). By making this determination, the techniques described in this specification can prevent any malicious files or resources (e.g., spam, malware, virus, etc.) from being uploaded to and propagated throughout the fact checking entities' systems. In this way, aspects of the present disclosure also address technical problems associated with computer security.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally relates to a fact check factor identifier that identifies fact check factors from digital documents irrespective of the format, style (including any markup that might be present in the document) or publisher/author of the digital document.

Figure 1:
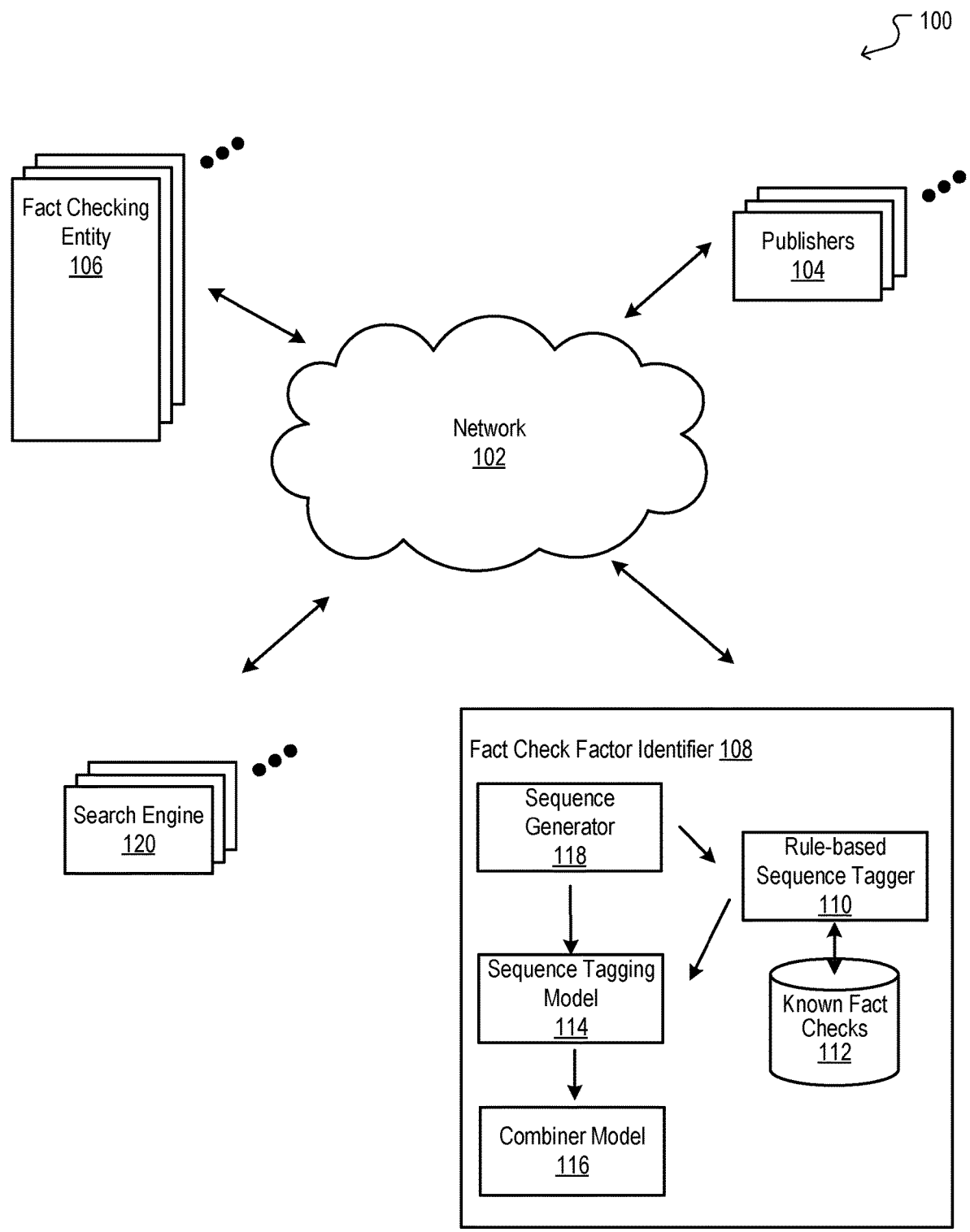
FIG. 1 is a block diagram of an example environment in which fact check factors are identified from a set of digital documents.

FIG. 1 is a block diagram of an example environment 100 in which fact check factors are identified from a set of digital documents.

The example environment 100 includes a network 102, such as a local area network (LAN), a wide area network (WAN), the Internet, or a combination thereof. The network 102 connects fact checking entities 106, publishers 104, search engines 120, and a fact check factor identifier 108. The example environment 100 may include many different fact checking entities 106, publishers 104, and search engines 120.

As used in this specification, a publisher 104 is an entity that publishes or makes available digital documents over a network 102. In some implementations, the publisher 104 can author the digital documents in addition to publishing (or making available) digital documents authored by other individuals or entities. Examples of digital documents published by a publisher 104 can include webpages, word processing documents, portable document format (PDF) documents, images, videos, and search results pages. As used in this specification, a fact checking entity 106 is an entity that verifies or evaluates the accuracy of statements made in fact check articles or other digital documents. A fact checking entity 106 can either be separate from a publisher 104 or it can be part of a publisher 104.

In some implementations, the fact check factor identifier 108 can be implemented as a service that is implemented within a fact checking entity 106's environment, within a publisher 104's environment, or within a search engine 120's environment. In some implementations, the fact check factor identifier 108 can be implemented as a web service that is implemented separate from any fact checking entity 106, publisher 104, or search engine 120, but is nevertheless accessible, over the network 102, to any fact checking entity 106, publisher 104, or search engine 120.

The fact check factor identifier 108 identifies fact check factors that are included in digital documents provided/published by one or more publishers 104. The fact check factor identifier 108 includes a sequence generator 118, a sequence tagging model 114, a combiner model 116, a rules-based sequence tagger 110, and a known fact checks storage device 112. Additional details about the structure and operations of the fact check factor identifier 108, including the structure and operation of each of these sub-components, is described below with reference to FIG. 2.

Figure 2:
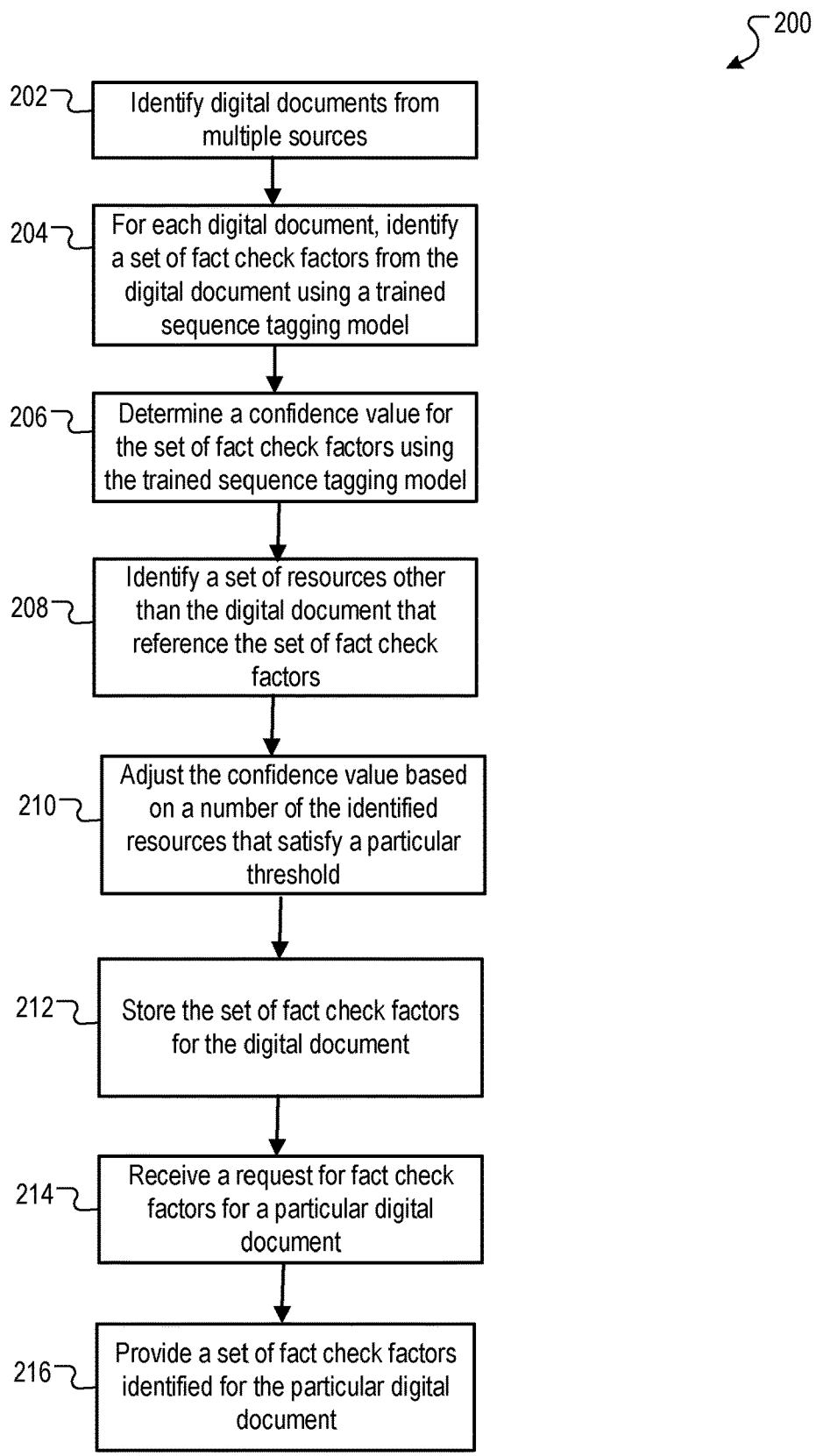
FIG. 2 is a flow diagram of an example process for identifying fact check factors from a set of digital documents.

FIG. 2 is a flow diagram of an example process 200 for identifying fact check factors from a set of digital documents. Operations of the process 200 are described below for illustration purposes only. Operations of the process 200 can be performed by any appropriate device or system, e.g., any appropriate data processing apparatus. Operations of the process 200 can also be implemented as instructions stored on a non-transitory computer readable medium. Execution of the instructions cause one or more data processing apparatus to perform operations of the process 200.

The fact check factor identifier 108 identifies digital documents from multiple sources (at 202). In some implementations, the fact check factor identifier 108 can identify digital documents from multiple sources (such as publishers 104) in response to a request sent by the fact check factor identifier 108 to these sources. In some implementations, the fact check factor identifier 108 can receive digital documents from multiple sources (such as publishers 104), e.g., on a periodic basis and without first sending a request.

For each identified digital document, operations 204, 206, and 208 can be performed, which are described below.

The fact check factor identifier 108 identifies, from a digital document, a set of fact check factors specifying at least a claim to be fact checked, a claimant that made the claim, and a veracity of the claim (at 204). In some implementations, the fact check factor identifier 108 first sends the digital document to a sequence generator 118 that generates equal length sequences of words for the words in the digital document. The sequence generator 118 provides the generated sequences of words to a trained sequence tagging model 114 (additional details about the training of the sequence tagging model are provided below).

The sequence tagging model 114 accepts as input a sequence of words and outputs an equal length sequence of labels—i.e., a label for each word in the input sequence of words. In some implementations, the sequence tagging model 114 can be implemented as a natural language processing model (e.g., BERT), supervised machine learning models, or other statistical learning models. In some implementations, a number of different sequence tagging models, other than or in addition to BERT, can be used.

The labels output by the sequence tagging model can include both positive and negative labels. Each positive label represents one of the fact check factors and each negative label represents a word that does not belong to any fact check factor. For example, implementations that include three fact check factors, e.g., claim, claimant, and verdict, include three respective positive labels: claim, claimant, and verdict. Below is an example of a sequence of words that can be input to the sequence tagging model, which in turn may output a corresponding sequence of labels (where label C represents the claim, label P represents the claimant, label V represents the veracity of the claim, and label NF represents that the corresponding word in the sequence is not a fact check factor):

| John | X | Doe | Falsely | said | that | the | Earth | is | flat |
|------|---|-----|---------|------|------|-----|-------|----|----|
| P    | P | P   | V       | NF   | NF   | C   | C     | C  | C  |

The sequences of labels that are generated by the sequence tagging model 114 and the corresponding sequences of words are then input to a combiner model 116, which uses these input sequences of words and the corresponding labels to generate the set of fact check factors for the digital document. In some implementations, for each label corresponding to a particular fact check factor, the combiner model 116 obtains the words in the sequences of words corresponding to that label, to generate that fact check factor.

In some implementations, the combiner model 116 is a rules-based engine that can combine words that are near each other. For example, assume a scenario in which portions of the claim (i.e., a fact check factor) were found in two regions of sentence made up of nine words: a first region made up of the first three words (words at positions 1 to 3) and a second region made up of the last three words (words at positions 6 to 9). In this example, the combiner model 116 can determine that the two regions are nearby or close to each other (e.g., based on a nearby threshold that considers, e.g., regions that are ten or fewer words apart as nearby or close to each other) and thus, combines all the words spanning between the two regions (i.e., words 1 to 9) to obtain the claim. Alternatively, the combiner model 116 can only combine the words making up the two regions, in which case, the claim would be made up of the words at positions 1 to 3 followed by words at positions 6 to 9. Other rules can be used, alone or together with the above rule, to combine the identified portions/regions of a fact check factor. For example, the combiner model 116 can have rules that remove redundant words or phrases that may be found in the different identified regions and then combine only the unique words in the identified regions.

In some implementations, instead of a rules-based engine, the combiner model 116 can be implemented as a learning model (e.g., a supervised machine learning model, natural language processing model, or another appropriate statistical model) that is trained using known tagged sequences and the corresponding fact check factors. Such a model can be trained to account for various features in the tagged sequences and the corresponding digital document (e.g., distance between the identified regions, redundancies across the different regions, semantics of combining the different regions, locations of the identified regions within the digital document, etc.). Thus, when such a trained model receives the tagged sequences for a digital document, it can determine the combined sequence that makes up a fact check factor.

The fact check factor identifier 108 determines a confidence value representing a likelihood that the set of fact check factors identified from the digital document are an actual set of fact check factors for the digital document (at 206). In some implementations, for each sequence of labels that are output by the sequence tagging model 114, this model 114 also outputs an initial label confidence value representing a likelihood that the identified labels (corresponding to particular fact check factors) actually identify the fact check factors. Subsequently, when the combiner model 116 generates the fact check factors using the sequence of labels and the sequence of words, the combiner model 116 uses the initial label confidence values in determining a confidence value (also referred to as an overall confidence value) representing a likelihood that the set of fact check factors identified from the digital document are an actual set of fact check factors for the digital document.

In some implementations, the overall confidence value determination is performed as a log-likelihood of generating the sequence of labels over the words. In such implementations, the overall confidence value determination can be biased towards what the model has observed during training. In some implementations, this bias can be avoided or reduced by using a separate model (e.g., a machine learning model or another appropriate, statistical model) to determine the overall confidence value by considering one or more of the following example factors: the identified fact check factors, the initial confidence values, the lengths of the regions within the digital document from which the fact check factors are identified, the number of such regions, and the number of times that the identified claim is found in other resources (as described further with reference to operation 208). Such a model can be trained using known fact check factors and using data about the above-identified factors that can be identified from the corresponding fact check articles from which the known fact check factors are identified. Once trained, such a model can accept as input data about one or more of the above factors and one or more of the above example factors (or other example factors) and use this to estimate the overall confidence value.

The fact check factor identifier 108 identifies a set of resources other than the digital document that reference the set of fact check factors (at 208). In some implementations, the fact check factor identifier issues a search query to one or more search engines 120, in which it includes the identified set of fact check factors. In response to this search query, the one or more search engines 120 may return a set of search results. For a threshold number of search results (e.g., the top 10 search results, the top 50 search results, etc.) that do not include the particular digital document, the fact check factor identifier 108 can identify a set of resources (e.g., web page) corresponding to the search results. A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

For each of the resources, the fact check factor identifier 108 determines if the words of the fact check factors match, in whole or in part, the words of the resource. The resources for which the amount of matching words satisfies (e.g., meets or exceeds) a particular threshold (e.g., 80%, 90%, etc.), the fact check factor identifier 108 identifies such resources as the set of resources that reference the set of fact check factors.

The fact check factor identifier 108 adjusts the confidence value based on a number of the identified resources (as identified in operation 208) that satisfy a particular threshold (at 210). In some implementations, the fact check factor identifier 108 can increase the confidence value by a certain amount if the number of identified resources (as described in operation 208) satisfies (e.g., meets or exceeds) a particular threshold (e.g., five, ten, twenty, etc.). In some implementations, the fact check factor identifier 108 can increase the confidence value by a fixed amount regardless of the number of identified resources that exceed the particular threshold. Alternatively, the fact check factor identifier 108 can increase the confidence value by an amount proportional to the number of identified resources that exceed the particular threshold (e.g., increase confidence by 5% for each five additional resources in excess of the particular threshold). In some implementations, the fact check factor identifier 108 can decrease the confidence value by a certain amount if the number of identified resources (as described in operation 208) does not satisfy (e.g., is less than) the particular threshold (e.g., five, ten, twenty, etc.). In some implementations, the fact check factor identifier 108 can decrease the confidence value by a fixed amount or an amount proportional to the number of identified resources that are less than the particular threshold (e.g., decrease confidence value by 5% for each five additional resources that are less than the particular threshold).

The fact check factor identifier 108 stores the fact check factors in a storage device (at 212). In some implementations, the fact check factor identifier 108 stores all the fact check factors generated by the combiner model, irrespective of their corresponding confidence values (as described with reference to operations 206-210). Alternatively, the fact check factor identifier 108 stores only those fact check factors for which the confidence value satisfies (e.g., meets or exceeds) a particular threshold (e.g., 60%, 70%, etc.). In some implementations, the fact check factor identifier 108 stores, e.g., in a table, an identifier for the digital document and the corresponding set of fact check factors. In some implementations, this table may also include the confidence values output by the combiner model and, in some cases, as adjusted by the fact check factor identifier (as described with reference to operations 206 and 208).

The fact check factor identifier 108 receives a request for fact check factors for a particular digital document (at 212). In some implementations, a fact checking entity 106 (or another entity) can submit a request to the fact check factor identifier 108 to provide the fact check factors for a particular digital document. This request can include the actual digital document or a web link to the digital document. The particular digital document can be one of the digital documents that were identified at operation 202 or can be another digital document not included in the documents identified at operation 202.

The fact check factor identifier 108 provides a set of fact check factors identified for the particular digital document (at 214). If the particular digital document is one of the documents that is identified at operation 202, the fact check factor identifier can use the digital document's identifier (e.g., a file name, a file hash, etc.) to lookup the corresponding fact check factors stored in the storage device for this particular digital document. The fact check factor identifier 108 provides the set of fact check factors retrieved from the storage to the entity, e.g., the fact checking entity 106, that requested the fact check factors. If the particular digital document is not among the documents identified at operation 202, the fact check factor identifier 108 can generate the fact check factors for this particular document on demand using the operations 204-206 (and in some implementations, also using operations 208 and 210).

In some implementations, the sequence tagging model 114 is trained using a set of known fact check articles and a corresponding set of known fact check factors that are stored in the known fact checks storage device 112. As part of this training, the words of each known fact check article are divided into equal length sequences of words, e.g., using the sequence generator 118. For each such sequence of words, a rules-based sequences tagger 110 generates a corresponding sequence of labels by matching the words of the fact check factors for the fact check article with the words in the sequence of words. Each label can either be a positive label that represents one of the fact check factors or a negative label that represents a word that does not belong to any fact check factor. The sequence tagging model 114 is trained to generate a sequence of labels for an input sequence of words using each sequence of labels generated by the rules-based sequence tagger and the corresponding sequences of words in the known fact check article.

There can be at least two types of the rules-based sequence taggers 110: (1) a concise tagger and (2) a fluent tagger. In implementations of the concise tagger, if a word in the sequence of words matches a word of the fact check factors, the tagger assigns a corresponding label for that fact check factor to the position in the sequence of labels that corresponds to the word in the sequence of words. This is illustrated using the example table below, which identifies (1) a known set of fact check factors, including the claim, claimant, and verdict (as shown in the first row), (2) a sequence of words (as shown in the second row), and (3) a corresponding sequence of labels that would be generated by a concise tagger (as shown in the third row). As used in the table below, the label C represents the claim, the label P represents the claimant, the label V represents the veracity of the claim, and the label NF represents that the corresponding word in the sequence is not a fact check factor.

| | Claim: Africa is a country. | | | | Claimant: John Doe | | | Verdict: False | | |
|---|---|---|---|---|---|---|---|---|---|---|
| Sequence of words | John | X | Doe | Falsely | said | Africa | is | actually | a | country |
| Sequence of labels | P | NF | P | V | NF | C | C | NF | C | C |

In implementations where a fluent tagger is used, if a word in the sequence of words matches a word of the fact check factors, the tagger (1) assigns a label for that fact check factor to the position in the sequence of labels that corresponds to the position of that word in the sequence of words and (2) also assigns the label to all other words in the span of words that are booked ended by the same label (or fact check factor). This is illustrated using the example table below, which identifies (1) a known set of fact check factors, including the claim and the claimant, and verdict (as shown in the first row), (2) a sequence of words (as shown in the second row), and (3) a corresponding sequence of labels that would be generated by a concise tagger (as shown in the third row). As used in the table below, the label C represents the claim, the label P represents the claimant, the label V represents the veracity of the claim, and the label NF represents that the corresponding word in the sequence is not a fact check factor.

|  | Claim: Africa is a country. |  |  |  | Claimant: John Doe |  |  | Verdict: False |  |  |
|---|---|---|---|---|---|---|---|---|---|---|
| Sequence of Words | John | X | Doe | Falsely | said | Africa | is | actually | a | country |
| Sequence of Labels | P | P | P | V | NF | C | C | C | C | C |

As shown in the above table, the fluent tagger identifies the claimant as John X Doe, even though the known claimant is John Doe. Similarly, the fluent tagger identifies the claim as "Africa is actually a country," even though the known claim is "Africa is a country." In this regard, the fluent tagger is focused more on readability in generating labels, even if doing so includes unessential details in the sequence. On the contrary, the concise tagger is focused more on brevity as it only selects essential words of factors, but the results could be less readable if the matched factors miss several words.

In this manner, the sequence tagging model 114 is trained to generate a sequence of labels for an input sequence of words using a set of known fact check articles and a corresponding set of known fact check factors that are stored in the known fact checks storage device 112.

Figure 3:
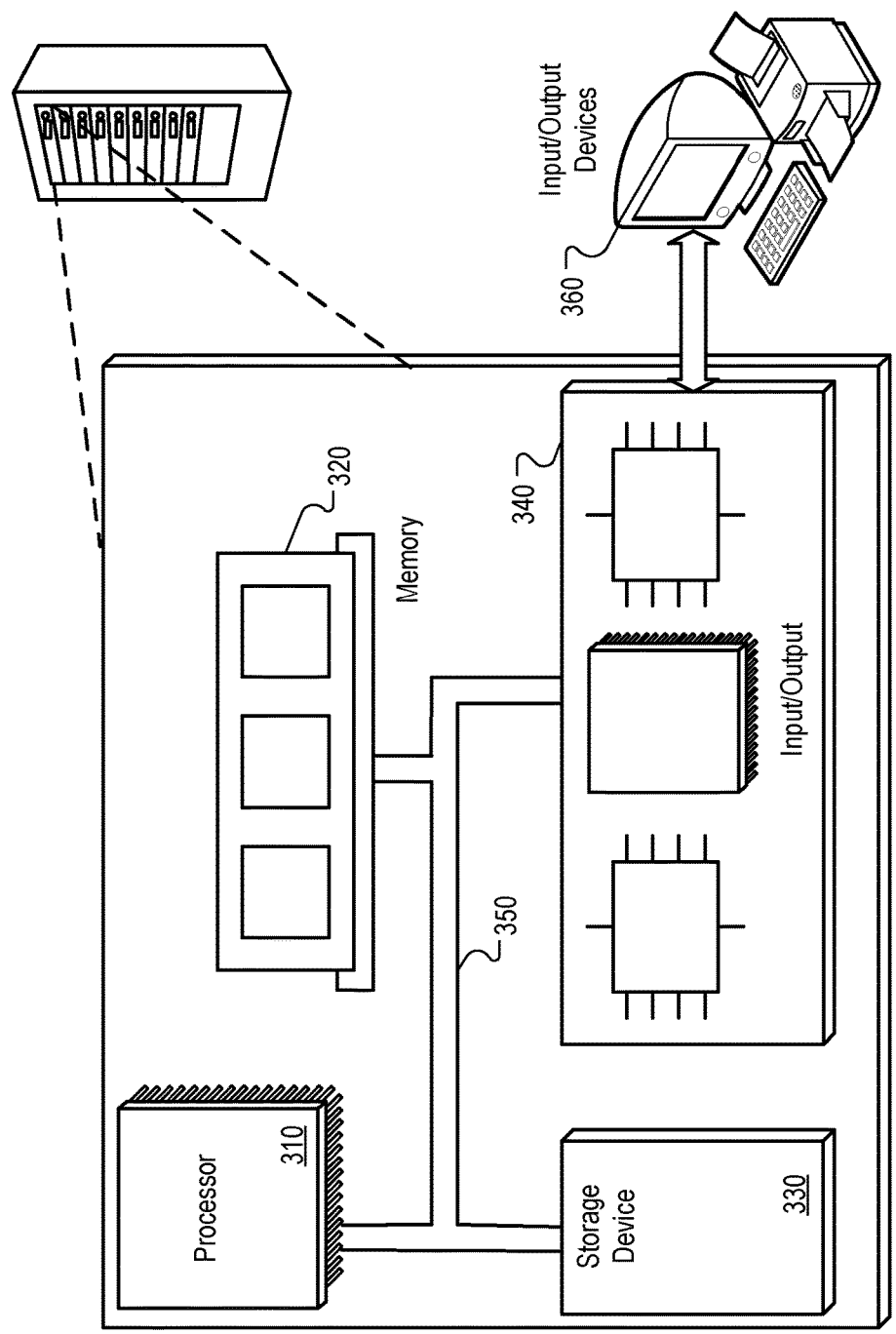
FIG. 3 is a block diagram of an example computer system.

FIG. 3 is a block diagram of an example computer system 300 that can be used to perform operations described above. The system 300 includes a processor 310, a memory 320, a storage device 330, and an input/output device 340. Each of the components 310, 320, 330, and 340 can be interconnected, for example, using a system bus 350. The processor 310 is capable of processing instructions for execution within the system 300. In some implementations, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In some implementations, the memory 320 is a volatile memory unit. In another implementation, the memory 320 is a non-volatile memory unit.

The storage device 330 is capable of providing mass storage for the system 300. In some implementations, the storage device 330 is a computer-readable medium. In various different implementations, the storage device 330 can include, for example, a hard disk device, an optical disk device, a storage device that is shared over a network by multiple computing devices (e.g., a cloud storage device), or some other large capacity storage device.

The input/output device 340 provides input/output operations for the system 300. In some implementations, the input/output device 340 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 360. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
identifying digital documents from a plurality of sources;
for each of the digital documents:
   implementing a trained sequence tagging model to identify, from the digital document, a set of fact check factors specifying a claim to be fact checked, a claimant that made the claim, and a veracity of the claim, wherein the trained sequence tagging model is configured to:
      obtain, as an input, a sequence of words from the digital document, and
      output a label for each word in the sequence of words from the digital document, wherein each label corresponds to one of the fact check factors or indicates that a word that does not belong to any fact check factor;
   processing the label for each word in the sequence of words from the digital document to generate the set of fact check factors;
   determining, based on the trained sequence tagging model, a confidence value representing a likelihood that the set of fact check factors identified from the digital document are an actual set of fact check factors for the digital document; and
   storing, in a storage device, the set of fact check factors in association with the digital document;
receiving, from a fact checking entity, a request for fact check factors for a particular digital document among the digital documents; and
in response to receiving the request for fact check factors for the particular digital document, providing, to the fact checking entity, the set of fact check factors identified from the particular digital document.

2. The method of claim 1, further comprising:
for each digital document, determining whether the confidence value satisfies a confidence threshold; and
wherein storing the set of fact check factors in association with the digital document comprises storing the set of fact check factors in association with the digital document only when the confidence value satisfies the confidence threshold.

3. The method of claim 2, further comprising: for each digital document:
identifying, using a search engine and based on the set of fact check factors, a set of resources other than the digital document that reference the set of fact check factors; and
adjusting the confidence value based on whether a particular number of resources from the set of resources satisfy a particular threshold.

4. The method of claim 1, further comprising:
training the sequence tagging model, the training comprising:
   obtaining a set of known fact check articles and a corresponding set of known fact check factors; and
   for each known fact check article:
      generating equal length sequences of words using words present in the known fact check article; and
      for each sequence of words, generating a sequence of labels for each sequence of words by matching the words of the known fact check factors for the known fact check article with words in the sequence of words, wherein each label either represents one of the fact check factors or represents a word that does not belong to any fact check factor; and
   training the sequence tagging model to generate a sequence of labels for an input sequence of words using sequences of words in the known fact check article and the corresponding sequence of generated labels.

5. The method of claim 1, wherein processing the label for each word in the sequence of words from the digital document to generate the set of fact check factors comprises:
combining one or more words from a first region of the sequence of words which are associated with a label corresponding to one of the fact check factors with one or more words from a second region of the sequence of words which are also associated with the label corresponding to the one of the fact check factors, based on a distance between the first region and the second region.

6. The method of claim 1, wherein processing the label for each word in the sequence of words from the digital document to generate the set of fact check factors comprises:
determining whether one or more words from a first region of the sequence of words which are associated with a label corresponding to one of the fact check factors is redundant to one or more words from a second region of the sequence of words which are also associated with the label corresponding to the one of the fact check factors; and
removing the one or more words from the first region, in response to determining the one or more words from the first region is redundant to the one or more words from the second region.

7. A system comprising:
one or more processing devices; and
one or more non-transitory machine-readable storage devices storing instructions that are executable by the one or more processing devices to cause performance of operations comprising:
   identifying digital documents from a plurality of publishers;
   for each of the digital documents:
      implementing a trained sequence tagging model to identify, from the digital document, a set of fact check factors specifying a claim to be fact checked, a claimant that made the claim, and a veracity of the claim, wherein the trained sequence tagging model is configured to:
         obtain, as an input, a sequence of words from the digital document, and
         output a label for each word in the sequence of words from the digital document, wherein each label corresponds to one of the fact check factors or indicates that a word that does not belong to any fact check factor;
      processing the label for each word in the sequence of words from the digital document to generate the set of fact check factors;
      determining, based on the trained sequence tagging model, a confidence value representing a likelihood that the set of fact check factors identified from the digital document are an actual set of fact check factors for the digital document; and storing, in a storage device, the set of fact check factors in association with the digital document;

receiving, from a fact checking entity, a request for fact check factors for a particular digital document among the digital documents; and in response to receiving the request for fact check factors for the particular digital document, providing, to the fact checking entity, the set of fact check factors identified from the particular digital document.

8. The system of claim 7, wherein the operations further comprise:

for each digital document, determining whether the confidence value satisfies a confidence threshold; and wherein storing the set of fact check factors in association with the digital document comprises storing the set of fact check factors in association with the digital document only when the confidence value satisfies the confidence threshold.

9. The system of claim 8, wherein the operations further comprise: for each digital document:

identifying, using a search engine and based on the set of fact check factors, a set of resources other than the digital document that reference the set of fact check factors; and adjusting the confidence value based on whether a number of resources from the set of resources satisfy a particular threshold.

10. The system of claim 7, wherein the operations further comprise:

training the sequence tagging model, the training comprising:

obtaining a set of known fact check articles and a corresponding set of known fact check factors; and for each known fact check article:

generating equal length sequences of words using words present in the known fact check article; and for each sequence of words, generating a sequence of labels for each sequence of words by matching the words of the known fact check factors for the known fact check article with words in the sequence of words, wherein each label either represents one of the fact check factors or represents a word that does not belong to any fact check factor; and training the sequence tagging model to generate a sequence of labels for an input sequence of words using sequences of words in the known fact check article and the corresponding sequence of generated labels.

11. The system of claim 7, wherein processing the label for each word in the sequence of words from the digital document to generate the set of fact check factors comprises:

combining one or more words from a first region of the sequence of words which are associated with a label corresponding to one of the fact check factors with one or more words from a second region of the sequence of words which are also associated with the label corresponding to the one of the fact check factors, based on a distance between the first region and the second region.

12. The system of claim 7, wherein processing the label for each word in the sequence of words from the digital document to generate the set of fact check factors comprises:

determining whether one or more words from a first region of the sequence of words which are associated with a label corresponding to one of the fact check factors is redundant to one or more words from a second region of the sequence of words which are also associated with the label corresponding to the one of the fact check factors; and removing the one or more words from the first region, in response to determining the one or more words from the first region is redundant to the one or more words from the second region.

13. A non-transitory computer readable medium storing instructions that are executable by one or more processing devices to cause performance of operations comprising:

identifying digital documents from a plurality of publishers;

for each of the digital documents:

implementing a trained sequence tagging model to identify, from the digital document, a set of fact check factors specifying a claim to be fact checked, a claimant that made the claim, and a veracity of the claim, wherein the trained sequence tagging model is configured to:

obtain, as an input, a sequence of words from the digital document, and output a label for each word in the sequence of words from the digital document, wherein each label corresponds to one of the fact check factors or indicates that a word that does not belong to any fact check factor;

processing the label for each word in the sequence of words from the digital document to generate the set of fact check factors;

determining, based on the trained sequence tagging model, a confidence value representing a likelihood that the set of fact check factors identified from the digital document are an actual set of fact check factors for the digital document; and storing, in a storage device, the set of fact check factors in association with the digital document;

receiving, from a fact checking entity, a request for fact check factors for a particular digital document among the digital documents; and in response to receiving the request for fact check factors for the particular digital document, providing, to the fact checking entity, the set of fact check factors identified from the particular digital document.

14. The non-transitory computer readable medium of claim 13, the operations further comprising:

for each digital document, determining whether the confidence value satisfies a confidence threshold; and wherein storing the set of fact check factors in association with the digital document comprises storing the set of fact check factors in association with the digital document only when the confidence value satisfies the confidence threshold.

15. The non-transitory computer readable medium of claim 14, the operations further comprising:

for each digital document:

identifying, using a search engine and based on the set of fact check factors, a set of resources other than the digital document that reference the set of fact check factors; and adjusting the confidence value based on whether a number identified from the set of resources satisfy a particular threshold.

16. The non-transitory computer readable medium of claim 13, the operations further comprising:
- training the sequence tagging model, the training comprising:
  - obtaining a set of known fact check articles and a corresponding set of known fact check factors; and
  - for each known fact check article:
    - generating equal length sequences of words using words present in the known fact check article; and
    - for each sequence of words, generating a sequence of labels for each sequence of words by matching the words of the known fact check factors for the known fact check article with words in the sequence of words, wherein each label either represents one of the fact check factors or represents a word that does not belong to any fact check factor; and
  - training the sequence tagging model to generate a sequence of labels for an input sequence of words using sequences of words in the known fact check article and the corresponding sequence of generated labels.

17. The non-transitory computer readable medium of claim 13, wherein processing the label for each word in the sequence of words from the digital document to generate the set of fact check factors comprises:
- combining one or more words from a first region of the sequence of words which are associated with a label corresponding to one of the fact check factors with one or more words from a second region of the sequence of words which are also associated with the label corresponding to the one of the fact check factors, based on a distance between the first region and the second region.

18. The non-transitory computer readable medium of claim 13, wherein processing the label for each word in the sequence of words from the digital document to generate the set of fact check factors comprises:
- determining whether one or more words from a first region of the sequence of words which are associated with a label corresponding to one of the fact check factors is redundant to one or more words from a second region of the sequence of words which are also associated with the label corresponding to the one of the fact check factors; and
- removing the one or more words from the first region, in response to determining the one or more words from the first region is redundant to the one or more words from the second region.

* * * * *